(12) United States Patent
Paz-Meidan et al.

(10) Patent No.: US 8,774,981 B2
(45) Date of Patent: Jul. 8, 2014

(54) INFANTRY ROBOTIC PORTER SYSTEM AND METHODS USEFUL IN CONJUNCTION THEREWITH

(75) Inventors: Uri Paz-Meidan, Herzlia (IL); Hanan Lepek, Jerusalem (IL); Ofer Glazer, Tel Aviv (IL)

(73) Assignee: Israel Aerospace Industries Ltd., Lod (IL)

( * ) Notice: Subject to any disclaimer, the term of this patent is extended or adjusted under 35 U.S.C. 154(b) by 333 days.

(21) Appl. No.: 12/881,552

(22) Filed: Sep. 14, 2010

(65) Prior Publication Data

US 2011/0172850 A1 Jul. 14, 2011

(30) Foreign Application Priority Data

Sep. 14, 2009 (IL) .......................................... 200921

(51) Int. Cl.
*G05D 1/00* (2006.01)
(52) U.S. Cl.
USPC .......... 701/2; 701/1; 701/23; 701/26; 701/41; 701/408; 700/25; 700/245; 700/246; 700/247; 700/257
(58) Field of Classification Search
USPC ......... 701/1, 2, 23–26, 41, 50, 301–302, 489; 700/61, 76, 245–248, 254
See application file for complete search history.

(56) References Cited

U.S. PATENT DOCUMENTS

| | | | |
|---|---|---|---|
| 4,939,651 A * | 7/1990 | Onishi | 701/26 |
| 5,187,537 A | 2/1993 | Asayama | |
| 5,517,098 A | 5/1996 | Dong | |
| 5,648,901 A * | 7/1997 | Gudat et al. | 701/23 |
| 5,680,122 A | 10/1997 | Mio | |
| 5,810,105 A | 9/1998 | Trainer | |
| 6,032,097 A | 2/2000 | Iihoshi et al. | |
| 6,142,251 A | 11/2000 | Bail | |
| 6,301,530 B1 | 10/2001 | Tamura | |
| 6,327,219 B1 | 12/2001 | Zhang et al. | |
| 6,356,820 B1 | 3/2002 | Hashimoto et al. | |
| 6,484,068 B1 | 11/2002 | Yamamoto et al. | |
| 6,509,707 B2 * | 1/2003 | Yamashita et al. | 318/567 |
| 6,580,978 B1 * | 6/2003 | McTamaney | 701/23 |
| 6,640,164 B1 | 10/2003 | Farwell et al. | |
| 6,842,674 B2 * | 1/2005 | Solomon | 701/23 |
| 7,062,381 B1 | 6/2006 | Rekow et al. | |
| 7,149,611 B2 * | 12/2006 | Beck et al. | 701/2 |

(Continued)

FOREIGN PATENT DOCUMENTS

| | | |
|---|---|---|
| DE | 10 2007 053 7 | 5/2009 |
| JP | A-06-274223 | 9/1994 |

(Continued)

OTHER PUBLICATIONS

Mule-2008.*

(Continued)

*Primary Examiner* — John R Olszewski
*Assistant Examiner* — Truc M Do
(74) *Attorney, Agent, or Firm* — Oliff PLC

(57) ABSTRACT

A robotic system comprising a robotic platform; a follow-path functionality enabling the robotic platform to follow a leading soldier, at least selectably, without reliance on GPS; and a Human Machine Interface between the platform and a leading soldier.

19 Claims, 11 Drawing Sheets

(56) References Cited

U.S. PATENT DOCUMENTS

| | | | |
|---|---|---|---|
| 7,211,980 B1* | 5/2007 | Bruemmer et al. | 318/587 |
| 7,499,774 B2* | 3/2009 | Barrett et al. | 701/23 |
| 7,539,557 B2* | 5/2009 | Yamauchi | 700/245 |
| 7,584,045 B2* | 9/2009 | Peretz | 701/117 |
| 7,693,653 B2* | 4/2010 | Hussain et al. | 701/416 |
| 8,078,349 B1* | 12/2011 | Prada Gomez et al. | 701/23 |
| 8,086,396 B1* | 12/2011 | Farwell et al. | 701/482 |
| 8,190,295 B1* | 5/2012 | Garretson et al. | 700/245 |
| 8,271,132 B2* | 9/2012 | Nielsen et al. | 700/250 |
| 2002/0189871 A1* | 12/2002 | Won | 180/9.32 |
| 2004/0030449 A1* | 2/2004 | Solomon | 700/245 |
| 2004/0112660 A1 | 6/2004 | Johansson et al. | |
| 2004/0158358 A1* | 8/2004 | Anezaki et al. | 700/264 |
| 2004/0199292 A1 | 10/2004 | Sakagami et al. | |
| 2005/0216182 A1* | 9/2005 | Hussain et al. | 701/200 |
| 2006/0013450 A1 | 1/2006 | Shan et al. | |
| 2006/0015242 A1 | 1/2006 | Yoshida | |
| 2006/0028552 A1 | 2/2006 | Aggarwal et al. | |
| 2006/0064203 A1* | 3/2006 | Goto et al. | 700/245 |
| 2006/0089765 A1* | 4/2006 | Pack et al. | 701/23 |
| 2006/0089800 A1* | 4/2006 | Svendsen et al. | 701/301 |
| 2006/0106496 A1 | 5/2006 | Okamoto | |
| 2006/0161341 A1 | 7/2006 | Haegebarth et al. | |
| 2006/0204035 A1 | 9/2006 | Guo et al. | |
| 2006/0221328 A1 | 10/2006 | Rouly | |
| 2006/0229804 A1 | 10/2006 | Schmidt et al. | |
| 2006/0245617 A1 | 11/2006 | Shan et al. | |
| 2007/0114075 A1 | 5/2007 | Buehler et al. | |
| 2007/0156286 A1 | 7/2007 | Yamauchi | |
| 2007/0255480 A1 | 11/2007 | Southall et al. | |
| 2007/0291130 A1 | 12/2007 | Broggi et al. | |
| 2008/0009964 A1* | 1/2008 | Bruemmer et al. | 700/245 |
| 2008/0009967 A1* | 1/2008 | Bruemmer | 700/245 |
| 2008/0055103 A1 | 3/2008 | Koide | |
| 2008/0059007 A1* | 3/2008 | Whittaker et al. | 701/2 |
| 2008/0101652 A1 | 5/2008 | Zhao et al. | |
| 2008/0158256 A1* | 7/2008 | Russell et al. | 345/629 |
| 2008/0253613 A1* | 10/2008 | Jones et al. | 382/103 |
| 2008/0265821 A1 | 10/2008 | Theobald | |
| 2009/0125225 A1* | 5/2009 | Hussain et al. | 701/200 |
| 2009/0141938 A1 | 6/2009 | Lim et al. | |
| 2009/0326735 A1* | 12/2009 | Wood et al. | 701/2 |
| 2010/0036556 A1 | 2/2010 | Na et al. | |
| 2010/0063680 A1* | 3/2010 | Tolstedt et al. | 701/41 |

FOREIGN PATENT DOCUMENTS

| | | |
|---|---|---|
| JP | A-10-161743 | 6/1998 |
| JP | A-10-172099 | 6/1998 |
| JP | B2-03-371724 | 11/2002 |
| JP | A-2003-326479 | 11/2003 |
| JP | A-2007-52527 | 3/2007 |
| JP | A-2007-213367 | 8/2007 |
| JP | A-2007-286740 | 11/2007 |
| JP | A-2008-068339 | 3/2008 |
| KR | 10 2007 00082 | 1/2007 |
| WO | WO 2004/077378 A1 | 9/2004 |
| WO | WO 2007/131299 A1 | 11/2007 |
| WO | WO 2007/132033 A1 | 11/2007 |
| WO | WO 2009/037018 A2 | 3/2009 |
| WO | WO 2009/089369 A1 | 7/2009 |

OTHER PUBLICATIONS

Giovanetti et al., "Robotic Path Following using Navigational Unattended Ground Sensors (NAV-UGS), A Work in Process Report", NDIA $3^{rd}$ Annual Intelligent Vehicle Systems Symposium, Jun. 9-12, 2003 (UDLP), pp. 1-19.

Tennina et al., "Integrated GPS-Denied Localization, Tracking, and Personal Identification", *The Internet of Things: $20^{th}$ Tyrrhenian Workshop on Digital Communications,* DOI 10.1007/978-1-4419-1674-7_17.Springer Science+Business Media, LLC 2010, pp. 177-186.

Taylor et al., " GPS-Denied Geolocation for Geophysical Data Acquisition and Analysis", ENSCO, Inc., Greensboro, NC, Springfield, VA, pp. 340-347.

Farley et al., "Monocular SLAM: alternative navigation for GPS-denied areas" GPS World, Sep. 2008, pp. 1-3, http://findarticles.com/p/articles/mi_m0BPW/is_9_19/ai_n31186599/.

"Robotic Research plays key roles in Department of Defense robotic programs", Robotic Research, Innovative Engineering Solutions for Robotics, Sensing & Software, www.roboticresearch.com.

"GuruBhakts robots play follow-the-leader", GuruBhakts robots, Posted on Apr. 1, 2010, http://www.ubergizmo.com/15/archives/2010/04/gurubhakts_robots_play follow-the- . . .

Fujimori et al., "Mobile robot formation control using a modified leader-follower technique" IOS Press, Integrated Computer-Aided Engineering 15 (2008) 71-84.

Naroditsky et al., "VideoTrek: A Vision System for a Tag-along Robot", 2009 IEEE, pp. 1101-1108.

Hogg et al., "Algorithms and Sensors for Small Robot Path Following", Jet Propulsion Laboratory, Pasadena, California.

Squad Mission Support System (SMSS) from Lockheed Martin, http://www.defense-update.com/products/s/smss.htm.

Multifunction Utility/Logistics and Equipment, http://www.defense-update.com/products/n/mule-load-carrier.htm.

"BigDog, the rough terrain quadruped robot" Proceedings of the 17th world congress, the international federation of automatic control, Seoul, Korea, Jul. 6-11, 2008. http://web.unair.ac.id/admin/file/f_1773_bigdog.pdf.

* cited by examiner

| Command | Description | Controller | Feedback |
|---|---|---|---|
| Stay | Stay and don't move from your position | Mini + Full | Roger |
| Heel (+ range) | Follow my path at a designated predefined range | Mini + Full | Roger + Complied |
| Come | Arrive to my position. Can be given by any soldier who carries the Mini controller device | Mini + Full | Roger + Complied |
| Silence | Change to silence mode using electric power. If your battery is not loaded or you can't change to silent mode from any other reason – STOP! | Mini + Full | |
| E-Stop | Emergency stop | Mini + Full + Platform | |
| Take Control | Transfers the control over the platform between the soldiers | Mini + Full | Roger |
| LOS Steering | Remote control operation over the platform. Similar to any other remote controlled vehicle | Full | |
| NLOS Steering | OPTIONAL - Remote control operation over the platform based on a driving camera installed on the platform. Video is transmitted to the operator | Full | |
| Payload Operation | OPTIONAL – on top of the K9 operation of the platform the operator will be able to control a mounted payload (in the ISR & Strike suits) from his full platform controller | Full / Dedicated (acc to payload) | |

Fig. 3

|  | Immediate | Graphic Display |
|---|---|---|
| Roger | Singular |  |
| Complied | Singular |  |
| Fuel Level | Singular at intervals + warning | Accurate |
| Battery Charge | Singular at intervals + warning | Accurate |
| Minor Malfunction | Singular | Text message |
| Major Malfunction | Warning | Text message |
| Obstacle | Warning | Text message |

410: Measure follower position Vector F(ti) in relative coordinate system, relative to last reset point of the coordinate system. Ti is time i in measurement point i.

V

420: Measure with an instrument the relative position (distance and angle) between the leader and the follower = Vector D(ti).

V

430: Compute the leader position Vector L(ti) in relative coordinate system

Vector L(ti) = Vector F(ti) + Vector D(ti)

V

440: Insert Vector L(ti) to a FIFO queue 'q', as element q(n). n is currently the highest index number of the FIFO queue q.

Fig. 8

510: Perform the method of Fig. 7

V

520: Retrieve first element, q(1) from FIFO queue q. Do not delete element q(1) from FIFO queue q. q(1) is the current waypoint the follower is moving to.

V

530: If the distance Vector D(ti) between follower and leader < pre-programmed distance criteria, then the follower stop moving and wait T seconds and perform step 510. Else, continue to step 540.

V

540: If the distance between the follower & q(1) position < pre-programmed distance criteria, then continue to step 550. Else, the follower continue moving towards q(1) position. Jump to step 510.

V

550: Delete element q(1) from the FIFO queue q.

V

560: Repeat some or all of steps 510 to 550 until stopping criterion is reached

| Time | Leader Measured Position | Leader True position | Follower Measured position | Follower True Position | Notes |
| --- | --- | --- | --- | --- | --- |
| 1 | 0 | 0 | 0 | 0 | Resetting of the coordinate system. Leader and Follower start from reset point |
| 2 | 3 | 3+L(1) | 0 | 0 | L(i) represents the difference between the leader measured position and the leader true position |
| 3 | 6 | 6+L(2) | 0 | 0 | |
| 4 | 10 | 10+L(3) | 0 | 0 | Distance between follower position to leader position is greater than programmed distance criteria. Follower starts moving towards first waypoint |
| 5 | 14 | 14+L(4) | 3+epsilon | 3+epsilon+ f(1) | The follower has moved towards the first waypoint, position 3. If epsilon< X, the follower is close enough to this waypoint and moves toward the next waypoint f(j) represents the difference between the follower measured position and the true position. |
| .. | .. | .. | .. | .. | |
| N | Leader(n) | Leader(n)+ L(n) | Follower(n) | Follower(n)+ f(n) | f(n) and / or L(n) values are assumed to meet a resetting criteria. The system coordinates are being reset in a reset process |
| N+1 | 0 | 0 | 0 | 0 | Reset process. i.e The leading soldier is touching the robotic platform |
| N+2 | 2 | 2+L(1) | 0 | 0 | |
| .. | .. | .. | .. | .. | |
| N+m | 10 | 10+L(m) | 0 | 0 | Distance between follower position to leader position is greater than programmed distance criteria. Follower starts moving towards first waypoint |

Fig. 10

INFANTRY ROBOTIC PORTER SYSTEM AND METHODS USEFUL IN CONJUNCTION THEREWITH

REFERENCE TO CO-PENDING USA APPLICATIONS

None.

FIELD OF THE INVENTION

The present invention relates generally to robotic systems and more particularly to robotic systems with autonomous navigation functionality.

BACKGROUND OF THE INVENTION

The state of the art is exemplified by the following systems inter alia:

a. Tacom's Robotic Follower, descriptions of which are available online.

b. A system described online at the following http location: defense-update.com/products/m/mule-load-carrier.htm includes a vehicle designed to carry the load of two infantry squads, totaling about 2,000 pounds (907 kg), and support troops with water and power sources for extended operations. The estimated cost of each MULE platform (without mission systems) is expected to be US$300,000. The Mule will be a "follower" to the human team. Each of the team members will be able to order the Mule to come forward, to support the operation. Otherwise, the vehicle will maintain a safe distance behind the team, waiting for orders.

c. An SMSS system described online at the following http location: defense-update.com/products/s/smss.htm is designed to carry enough loads to support a single squad, and utilizes a sophisticated management system to enable autonomous movement over rough terrain, as well as amphibious capability for crossing rivers and marshes.

The disclosures of all publications and patent documents mentioned in the specification, and of the publications and patent documents cited therein directly or indirectly, are hereby incorporated by reference.

SUMMARY OF THE INVENTION

Typically, the advantages of modern battlefield equipment are limited by the weight carrying limitations and physical fitness of the field soldier. Ground infantry units take to battle only the gear the soldiers can carry. The remaining equipment, efficient and helpful as it may be, remains in base since the soldiers lack the physical capacity to carry it on their backs.

Certain embodiments of the present invention seek to provide a robotic platform constructed and operative for integration with ground infantry combat units. Modern combat arenas present challenges to the ground infantry unit. A single soldier's role and influence on the battlefield is constantly growing due to advanced payloads and gear he carries for battle. Functionalities or "segments", which future soldier programs define and intensify include command and control, communications, computers and intelligence (C4I), lethality, mobility, survivability, and sustainability. To upgrade these segments, it is desired to integrate advanced combat gear at the infantry level which upgrades soldiers' efficiency in battle.

Along with operational requirements of future soldier programs, other requirements include reduction of weight and volume, minimal energy consumption, adaptability to existing fighting gear and usability of the soldier machine interface.

Certain embodiments of the present invention seek to complement the future soldier's operational characteristics without increasing the payload on the infantrymen's backs, thereby to resolve the conflict between technological requirements and the physical constraints and limitations of the soldier.

Certain embodiments of the present invention seek to provide a robotic platform that escorts a group of 3-10 soldiers on various types of missions. The platform follows the soldiers and requires minimal attention from its operator, thus does not increase the soldier's workload.

Certain embodiments of the present invention seek to decrease the weight and volume of the load soldiers currently carry into the field.

Certain embodiments of the present invention seek to use existing systems and payloads and provide a platform to carry them, rather than focusing on the miniaturization of components.

Certain embodiments of the present invention seek to provide a robotic system based on existing technology thereby avoiding development of high risk robotic technological challenges.

Certain embodiments of the present invention seek to provide a robotic system which does not need to resort to use of GPS waypoints on a high resolution terrain map which may necessitate highly expensive onboard sensors.

Certain embodiments of the present invention seek to provide a robotic system which includes a follow Path mode replacing or obviating the following robot's navigation and perception system.

There is thus provided, in accordance with at least one embodiment of the present invention, a robotic system comprising a robotic platform; a follow-path functionality enabling the robotic platform to follow a leader, such as but not limited to a soldier, at least selectably, without reliance on GPS; and a Human Machine Interface between the platform and the leader e.g. soldier.

Also provided, in accordance with at least one embodiment of the present invention, is a robotic system comprising a robotic platform; a follow-path functionality enabling the robotic platform to follow a leading soldier; and a Human Machine Interface between the platform and a leading soldier, the interface being operative to provide to the robotic platform, and the robotic platform is operative to carry out, a set of dog-training commands.

Further in accordance with at least one embodiment of the present invention, the set of dog-training commands includes at least one of the following: stay, heel, come.

Still further in accordance with at least one embodiment of the present invention, the robotic platform provides logistics support at least one of a platoon level and a squad level.

Further in accordance with at least one embodiment of the present invention, the robotic platform includes a diversity of payloads.

Still further in accordance with at least one embodiment of the present invention, the diversity of payloads includes at least one replaceable "suit" from among the following set of replaceable "suits": at least one logistics "suit", at least one intelligence "suit", at least one protective "suit", and at least one attack "suit".

Additionally in accordance with at least one embodiment of the present invention, the robotic platform has no navigation system other than the follow-path functionality.

Yet further in accordance with at least one embodiment of the present invention, the follow-path functionality defines a current position of the soldier by its relationship to the platform and enables the robotic platform to follow the route of the soldier's footsteps.

Further in accordance with at least one embodiment of the present invention, the follow-path functionality relies on at least one of IR data, laser data, image processing data, scent data, inertial system data, RF data.

Still further in accordance with at least one embodiment of the present invention, the follow-path functionality enables the robotic platform to follow the soldier's route autonomously and wherein at least most alerts and signals arriving from the soldier are based solely on tactile means, thereby to obtain a robotic system suitable for combat situations in that only minimal cognitive resources from the soldier are required.

Further in accordance with at least one embodiment of the present invention, the interface includes a first intuitive remote control mode allowing an operator to carry out the set of dog-training commands and not allowing the operator to carry out complex tasks and a second complex remote control mode allowing the operator to carry out at least one complex task including at least one of Manual driving and control of at least one suit borne by the robotic platform.

Also provided, in accordance with at least one embodiment of the present invention, is a method for operating a robotic system comprising proving a follow-path functionality enabling a robotic platform to follow a leading soldier, at least selectably, without reliance on GPS; and providing a Human Machine Interface between the platform and a leading soldier.

Also provided, in accordance with at least one embodiment of the present invention, is a method for operating a robotic system comprising providing a follow-path functionality enabling a robotic platform to follow a leading soldier; and using a Human Machine Interface between the platform and a leading soldier to provide to the robotic platform, and using the robotic platform to carry out, a set of dog-training commands.

Further in accordance with at least one embodiment of the present invention, the interface includes a first intuitive remote control mode allowing an operator to carry out the set of dog-training commands and not allowing the operator to carry out complex tasks and a second complex remote control mode allowing the operator to carry out at least one complex task including at least one of Manual driving and control of at least one suit borne by the robotic platform.

Also provided, in accordance with at least one embodiment of the present invention, is a method for operating a robotic system comprising proving a follow-path functionality enabling a robotic platform to follow a leading soldier, at least selectably, without reliance on GPS; and providing a Human Machine Interface between the platform and a leading soldier.

Further provided, in accordance with at least one embodiment of the present invention, is a method for operating a robotic system comprising providing a follow-path functionality enabling a robotic platform to follow a leading soldier; and using a Human Machine Interface between the platform and a leading soldier to provide to the robotic platform, and using the robotic platform to carry out, a set of dog-training commands.

Additionally provided, in accordance with at least one embodiment of the present invention, is a robot-leader tracking system comprising a robot operative to identify a path being followed by a leader and to advance along the path.

Yet further provided, in accordance with at least one embodiment of the present invention, is a robot-leader tracking method comprising using a robot to identify a path being followed by a leader and to advance along the path.

Further in accordance with at least one embodiment of the present invention, the using comprises driving to an individual waypoint along the path and measuring the robot position in a relative coordinate system and measuring the distance and angle between the robot and the leader; computing the leader position in a relative coordinate system and storing the leader position as a highest waypoint in a memory device; extracting a next highest waypoint from the memory device and return to the driving using the next highest waypoint as the individual waypoint if the robot-leader distance is pre-determinedly large and the robot-waypoint distance is pre-determinedly small, and waiting a predetermined time period then returning to the driving if the robot-leader distance is pre-determinedly small, and otherwise, if the robot-waypoint distance is not pre-determinedly small, returning to the driving without waiting the time period.

Also provided, in accordance with certain embodiments of the present invention, is a method allowing a moving leader to maintain proximity with a robot, the method comprising providing a robot having a proximity maintaining functionality which allows the robot, except under non traversable conditions, to move in a direction which maintains leader-robot proximity; and if the non traversable conditions exist, alerting the moving leader to move from his current position back to the robot's current position and then to select a path other than that which the leader used previously, by which to move from the robot's current position to the leader's former current position.

Also provided, in accordance with certain embodiments of the present invention, is a robotic system comprising a robotic platform; a follow-path functionality enabling the robotic platform to follow a leader, at least selectably, without reliance on GPS; and a Human Machine Interface between the platform and the leader.

Also provided is a computer program product, comprising a computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

BRIEF DESCRIPTION OF THE DRAWINGS

Certain embodiments of the present invention are illustrated in the following drawings:

FIG. 3 is a table showing control commands useful in controlling the robotic system of FIG. 1, in accordance with certain embodiments of the present invention.

FIG. 4 is a table showing particulars of an example robotic platform feedback display constructed and operative in accordance with certain embodiments of the present invention.

FIG. 7 is a simplified flowchart illustration of a method by which a robot such as the robotic platform of FIG. 1, may identify a path being followed by a leader such as the combatant of FIG. 1.

FIG. 8 is a simplified flowchart illustration of a method for driving along a path built e.g. by the method of FIG. 7.

FIGS. 10 and 11, taken together, represent a numerical example of the operation of the embodiment of FIGS. 7-9, where FIG. 10 is a table of measured and true positions of a leader and follower at various times, and FIG. 11 is a diagram of these positions.

DETAILED DESCRIPTION OF CERTAIN EMBODIMENTS

Figure 1:
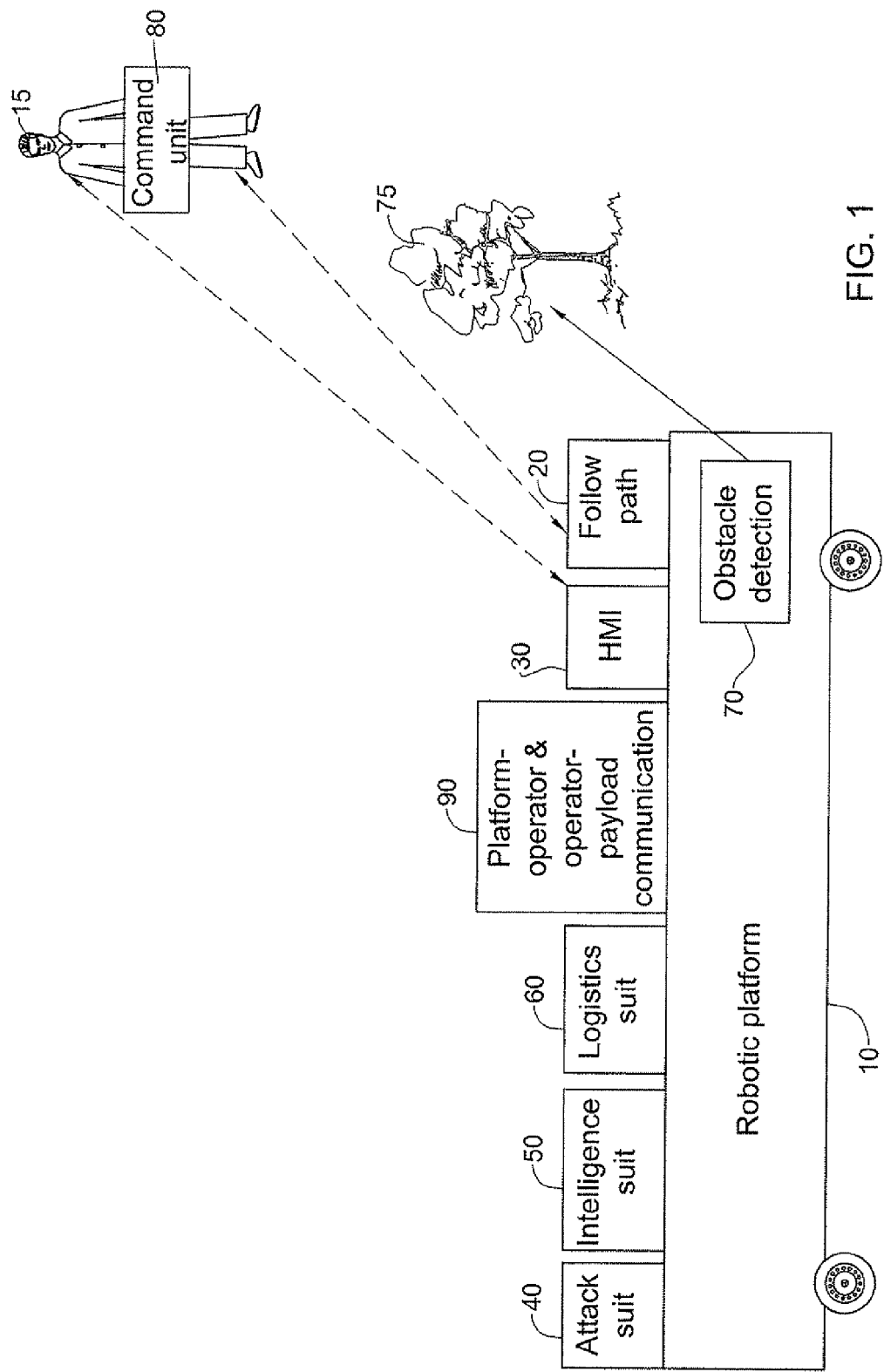
FIG. 1 is a simplified functional block diagram of a robotic system constructed and operative in accordance with certain embodiments of the present invention.

Reference is now made to FIG. 1 which is a simplified functional block diagram of a robotic system constructed and operative in accordance with certain embodiments of the present invention. The system of FIG. 1 includes a robotic platform 10 typically characterized by high navigability and transferability of the platform design. Platform 10's energy solution is typically based on an electric (relatively silent) and/or hybrid and/or fuel cell solution, so as to enable the vehicle, selectably, to drive in a mode which is silent relative to conventional diesel engines.

A Follow Path functionality 20 enables the robotic platform to follow the soldier using one or a combination of suitable technologies such as but not limited to laser, image processing, scent, inertial systems, RF.

A Human Machine Interface (HMI) 30 is provided between the platform and the leading soldier. The HMI may include an operator display based on PDA, tactile, visor, or other display technologies.

The Robotic Platform 10 is typically designed and optimized to enable it to escort soldiers in various types of terrain, according an application-specific performance envelope. The platform is typically sized to allow easy movement in the various environments in which the soldiers are active on foot, including urban areas. The base of the platform is adapted to allow quick and easy mounting of the various suits. The maximum length of operation (time between refueling) is adapted to the average length of the soldiers' activity which may be 72 hours, including approximately 24 hours of driving, during which silent, e.g. electrical travel is preferably possible. The design of the platform typically requires minimal attention from the soldier-operator thereof.

Typically, the robotic platform 10 has a basic configuration, which enables its maneuver, and one or more modular "suits", any subset of which can be rapidly mounted onto the platform. The term "suit" is used herein to include any package of technologies, gear and payloads that provide a comprehensive service for handling a specific mission. In the illustrated embodiment, the robotic platform 10 has three suits: an Attack suit 40, an Intelligence suit 50 and a Logistics suit 60. Selectably mounting a suit on the platform provides relevant capabilities to the forces, according to the mission.

Attack Suit 40 typically comprises an array of weaponry that is easily activated both during the day and/or at night. The attack suit typically has a capability to equip a Small Robot with sets of missiles or any other chosen weapon. This considerably increases the fire power and range of contact for infantry troops in anti-aircraft operations, anti-tank operations, and when assaulting structures. The Small Robot may be equipped with two missile arrays of any type depending on the specific combat arena.

The Intelligence and Protective Suit 50 may include a fixed observation system and an airborne observation system, both described below. A dedicated control system and display may provide full wireless control of both observation systems which together create an intelligence picture of the near vicinity of the soldiers which can be transmitted to various users via the communication system 90.

The airborne observation system of Intelligence and Protective Suit 50 may be based on a mini-UAV that can be manually launched or remotely launched from a distance.

The fixed observation system Intelligence and Protective Suit 50 may include a radar element and an optical element. It may be mounted on a dedicated mast and provides an intelligence picture of 360 degrees over a radius of 100 meters. In addition, this system can provide a protective framework and alerts. The protective framework gives the soldiers a new capability, which has not previously existed for operational service and greatly increases the survivability of the troops. The protective framework may for example provide alerts regarding missile launches in the direction of the soldiers as well as regarding movements of enemy ground forces within the protected radius.

The Logistics Suit 60 is typically purely mechanical. Its purpose is to ease the burden of the troops by bearing the load of armaments and other heavy resources. The suit has various storage spaces, intended and adapted according to the size of the equipment, for optimal distribution of weight in the vehicle, and for ready availability of equipment, for the transport of specific equipment.

An Obstacle Detection System 70 is typically mounted on the platform and operates automatically in operational states that require independent mobility of the Robot, with no interference from the operator. When encountering an obstacle 75 that the platform 10 cannot overcome, the obstacle detection system 70 alerts the operator-soldier typically via a soldier-borne command unit 80, of the situation and asks for his assistance in overcoming the obstacle. Obstacle detection may be based on any suitable technology such as but not limited to laser and/or image processing technology and/or ultrasonic sensors. It is appreciated that obstacle detection systems and sensors are well known in the field of robotics. Off the shelf systems, which may use laser or ultrasonic technology and/or perform suitable image processing, present the operator with pre-defined indications as to whether a particular obstacle impedes progress or can be overcome. The pre-defined indications are provided with reference to known characteristics of the platform's performance.

Typically, some or all of three operational states are provided to enable the soldier to control and operate the robotic platform 10 with minimal attention:

Follow Path system 20—This operational state is typically the default and requires only minimal attention from the operator. In this state, the robotic platform 10 follows one selected soldier, at a predefined distance according to the operational conditions of the mission and the terrain.

For example, two predefined distances may be selectably provided, including a "follow far" option and a "follow close" option. Command unit 80 may be used to perform the selection. The robotic platform 10 follows the virtual footprints of the soldier's route while overcoming obstacles in its path thanks to the platform's robustness. One possible technical solution for follow path is generation of a virtual footprint for the operator position, which the robotic platform follows.

Stay—In this state, the platform remains where it is until the operational state is changed. The systems, e.g. suits 40, 50 and 60, installed on the Robot continue to function and enhance the capabilities of the ground unit. The robotic platform 10 continues to receive the route followed by the soldier-operator and typically issues an alert when the limit of the operative envelope is approached.

Remote Control—In this state, the operator drives the robotic platform 10 by wireless remote control. The operator typically maintains a direct line of sight with the Robot and can exercise judgment regarding obstacles and which path to take. The Robot does not independently detect obstacles and does not interfere with the judgment of the operator, but typically does issue alerts regarding its envelope of performance.

Operation of the system of FIG. 1 while soldiers are advancing is typically based on the Follow Path mode and typically does not require cognitive effort on the part of the operator.

A Command Unit 80 is typically small and rugged and can typically be fastened to the operator's weapon, vest, or worn like a wristwatch. Its operation is extremely intuitive and enables immediate command of the robotic platform to perform Follow Far, Follow Close, or Stay. Manual driving, performance of complex tasks and activation of associated systems may be performed in a Remote Control mode, using a dedicated remote control device which may require more of the operator's attention.

Communication may be based on a central communication unit 90 mounted on the Robotic platform 70 which provides enhanced communication and data transfer capabilities between combatants and the platform. The communication unit 90 is responsible for the platform—operator communication that enables the follow path functionality 20 and remote operation of the platform and for an operator—payload communication protocol that enables the operation of a designated suit mounted on the platform 10, e.g. from among suits 40, 50 and 60 in the illustrated embodiment, typically based on the same human machine interface 30 that controls and operates the platform 10's mobility. The communication solution for remote operation and/or driving, follow path, emergency stop, vehicle condition indications and/or video may be based on any suitable existing technology such as but not limited to WiMax, RFID, WiFi, RF, Blue Tooth, Zigbee or any combination thereof.

Figure 2:
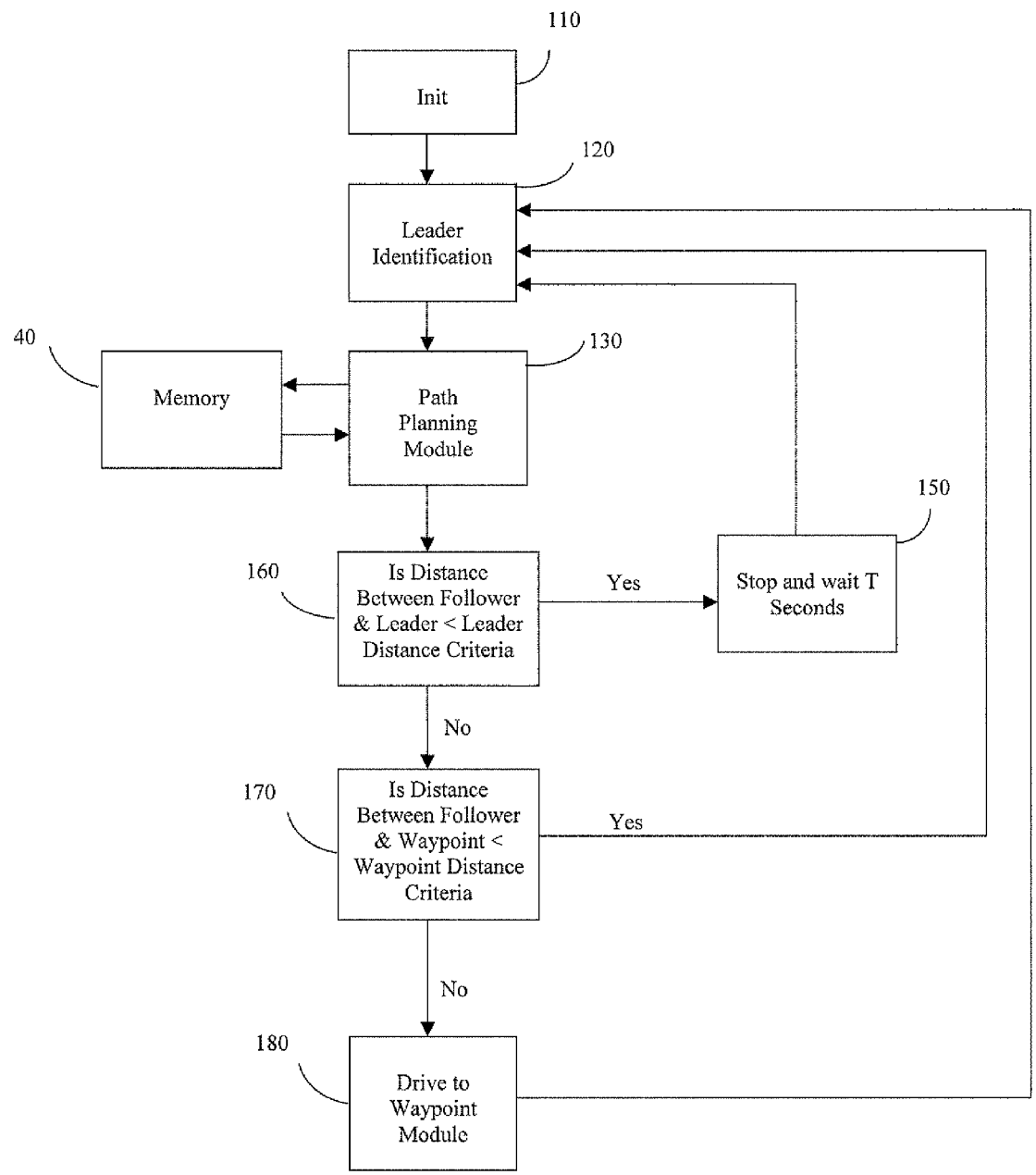
FIG. 2 is a simplified flowchart illustration of a tracking functionality performed by the system of the present invention during regular operation, in accordance with certain embodiments of the present invention.

FIG. 2 is a simplified flowchart illustration of a tracking functionality performed by the system of the present invention during regular operation. The method of FIG. 2 typically comprises some or all of the illustrated steps, suitably ordered e.g. as shown.

The Leader Identification step 120 involves knowledge of the robot as to who it should follow. This step may be implemented using any suitable technology, such as but not limited to the following:

a. RFID technology—For example, a unique ID may be transmitted over a RF wave from a transmitting module on the leader, to be decoded by a receiving module on the robot.

b. Image processing—For example, a light emitting component may be mounted on one of the soldier's wearable components, to be identified by a camera. The light emitting component wave length might be in any of the spectrum wavelengths such as UV, visible, Near IR, or IR or other that a suitable commercially available instrument can detect.

c. Laser—For example, a coded laser beam may be transmitted from the robot towards the soldier. A retro-reflector mounted on the soldier, reflects the beam directly back at the robot. A system on board the robot decodes the signal and identifies the soldier. If coding the signal is complex, this alternative may be used only for high-end systems.

According to certain embodiments of the present invention, in the event that the robotic platform 10 does not "see" the combatant it is following, due to communication limitations, the platform halts and waits for help.

In Path Planning Module 130, memory step 140, waiting step 150 distance, decision steps 160 and 170, and drive towards waypoint step 180 are typically operative to produce, by the combination of their operations, a path following functionality which extends beyond or differs from conventional "follow me" methodology as well as conventional Air-to-Air missiles which do not merely follow an aircraft, but also predict a future location thereof. The above conventional functionalities may be suitable if the robot moves in close proximity to the combat soldier. However, if it is desired to maintain a certain distance (i.e. 10 meters) as if often mandated by safety requirements and operational concept and experience, the following methodologies may be employed by the method of FIG. 2:

Path Planning Module: This module creates the path the follower is to follow according to the path and the positions of the leader. The path is built by waypoints that represent the leader positions. These waypoints are inserted into the Memory (e.g. a FIFO queue) and later extracted therefrom, when the follower needs to move to these waypoints. Typically, instruments such as a Laser Range Finder and/or suitable image processing methods might be used to measure the relative distance and angles between the leader to the follower. In addition the system typically measures its own position relative to a well known point (e.g. a pre-defined start point) in a virtual coordinates system.

The path planning module typically handles the memory in which it stores the path of the leader, and when the distance between the follower and the leader is greater than a certain criteria ("Is Distance Between Follower & Leader<Leader Distance Criteria" step 160) and the follower has not yet reached close enough to the waypoint where it supposed to reach according to the "Path Planning Module" ("Is Distance Between Follower & Waypoint<Waypoint Distance Criteria" step 170), the "Drive to waypoint" step 180 typically controls the follower to move to that waypoint. In the event the follower is too close to the leader (step 160), the system commands the follower to stop moving and to wait until the distance is large enough. During that time, the system typically verifies the target it is following ("Leader Identification" step 120) and then the "Path Planning Module" step 130 continues to measure and plan the path for the follower to follow. In the event the follower is close enough to the waypoint it should have reached (step 170), the "Path Planning Module" step 130 decides on the next waypoint along the path that the follower should reach.

The "Drive to waypoint module" step 180 manages the driving procedure, and in the event the follower cannot drive towards its next waypoint due to an obstacle along the driving path, mechanical failure or any other cause, it commands the follower to stop driving and transmits a signal for the leader to assist it. The robot typically does not include the intelligence necessary to understand what type of obstacle might be along the driving path and does not operate to achieve such understanding; instead, the robot may merely find out that the obstacle is too high (higher than a predetermined threshold, for example). The robot typically does not include the intelligence necessary to compute a new path and detour thereto and is typically not operative to compute such.

In the event that the follower cannot continue due to non traversable conditions (e.g. an obstacle that is blocking the path) the leader might suitably assist the follower, e.g. as follows. The leader may manually control the follower (i.e. using a remote control), or the leader may move back, e.g. backtrack, toward the follower, and then choose a new path to walk back to its former forward position. A calibration procedure might be used in this case.

Reference is now made to the table of FIG. 3 which lists operational commands given to the robotic system of FIG. 1 according to certain embodiments of the present invention. For example:

Stay: As a result of this order to the platform 10, the platform 10 stops and typically, the engine remains operating and the robot performs a certain operational action (like turning on an optical payload).

E-Stop: emergency stop. The vehicle stops immediately and the engine is typically turned off. E-Stop is an emergency command that enables all soldiers in the force to stop any robot within a communication range, in case of emergency.

Silence mode: The platform's engine is typically hybrid, and has a first conventional noisy driving mode and a second, electrical silent driving mode. Silent mode provides electrical power to the engine and enables the vehicle to drive quietly.

As shown, Control Commands are provided which implement the combatant's control over the platform and may include or be restricted to a set of dog training commands such as stay, heel, and come.

The operator uses his controller to guide the platform with few simple orders. Combatants may be equipped with two types of controllers including a mini-controller and a full controller. The Mini Controller is carried by all soldiers, enabling maximal flexibility over the control of the platform and employing the stay, heel, come, silence, e-stop, and take-control commands shown in the table of FIG. 3. The soldiers can transfer the control over the robot from one operator to another according to operational requirements. If all soldiers carry a device that is recognized by the robot, follow path mode can be exchanged between the operators. The Full Controller enables remote operation of the platform using the LOS (line of sight) steering, NLOS (non-line of sight) steering and payload operation commands shown in the table of FIG. 3.

The feedback from the platform 10 may be provided as a display which includes immediate display and a graphic display as summarized in the table of FIG. 4. The immediate display presents the operator with indications of fuel level, battery charge, malfunctions and obstacles that the platform cannot overcome. The immediate display typically sends an alert (warning) to the operator when these indications occur. The display may be based on tactile indications from the Mini & Full Controller carried by the operator. The Graphic display presents feedback which is more accurate and complete than the immediate display. The graphic display is visible on the full controller or on the platform itself. For example, if the robotic platform's fuel level is dropping, the platform may send the operator an indicative alert such as a buzz to the operator's leg. The operator can then approach the platform to examine the precise level of fuel as represented on the graphical display.

A particular advantage of certain embodiments of the present invention is that miniaturization of components is mainly obviated since the main motive of such procedure is to minimize weight on the soldiers' backs. Extra energy is carried by the platform 10. Batteries may be charged in the field and existing payloads such as observation means and ammunition may be carried for battle by the robotic platform 10 with no tradeoff or weight considerations. Today, for example, in order to bring extra anti-tank missiles to the battlefield smaller and lighter missiles are normally designed so the soldiers will be able to carry more of them. The effect of the re-designed missile is not necessarily similar to that of the missile before re-designing.

An example of a tracking system useful in conjunction with the system shown and described above is now described in detail. The tracking system enables a follower object such as a robotic platform to follow a leading object such as but not limited to a human combatant, using the same path the leader has moved along. A following distance, as the crow flies or along the path, between the follower and the leader might be pre-defined, and/or can be defined and changed in real time by the leader.

GPS based systems are common both for civil and military usage. However, GPS based systems can be jammed by components that are commercially available. Also, GPS based systems can sometimes suffer from poor signal reception in urban areas, under or between trees and in other problematic areas. Therefore, a navigation system is typically provided which is not dependent on any GPS based system.

According to certain embodiments of the present invention, a robust, easy to operative and cost-effective system is provided by reducing or almost eliminating any autonomous ability from the robot. This may, for example, be achieved by having the robot move along the same path the leading object has moved, since it can be assumed that this path is obstacle-free, thereby obviating any need, or almost any need, for obstacle detection.

Certain embodiments of the present invention seek to provide a follower and leader which might not have a GPS based system, including a functionality for correlating the path of the leader and the path of the follower. Typically, a minimal instrument is borne by the Follower, including a driving instrument facilitating manned driving capability and an instrument capable of computing or measuring a follower coordinate relative to a most recently reset point ("last reset point") of a relative coordinate system, as described in detail below. The instrument borne by the leader may include a driving instrument (or independent motility as in the event of a human leader).

An example of a method for resetting the relative coordinates system, which is not intended to be limiting, is that a leader touches the follower system; at that moment the vector F(ti) representing the follower position, and the vector D(ti), representing the distance between the follower and the leader, both equal 0.

According to certain embodiments of the present invention, the follower e.g. robotic platform and/or leader may bear one or more of INS (inertial navigation system), IMU (inertial measurement system), odometer and/or any other measurement instrument (termed herein for simplicity "instrument") which enables a follower or leader to track changes in its own position, including its own motion along any or all of up to six degrees of freedom and/or first or second derivatives thereof such as angular or linear velocity or acceleration parameters; and/or to track its position relative to the leader/follower.

Optionally, the leader e.g. combatant occasionally e.g. periodically and/or when alerted to do so by the system shown and described herein, resets the position change tracking system borne by the follower by determining and inputting the real relative position between leader and follower. For example, the leader may approach the follower and then zero the follower-leader distance to indicate that currently, the real and accurate distance between leader and follower is zero. The follower can then reset vector F(t), representing the follower position.

An alert providing functionality for resetting the relative coordinate system may be designed depending on the application. For example, if the application dictates a tolerance of 1 meter and it is found that the error accumulated by the measurement instruments strays by up to one meter within 3 hours, then an alert may be provided to the leader every 3 hours.

Figure 5:
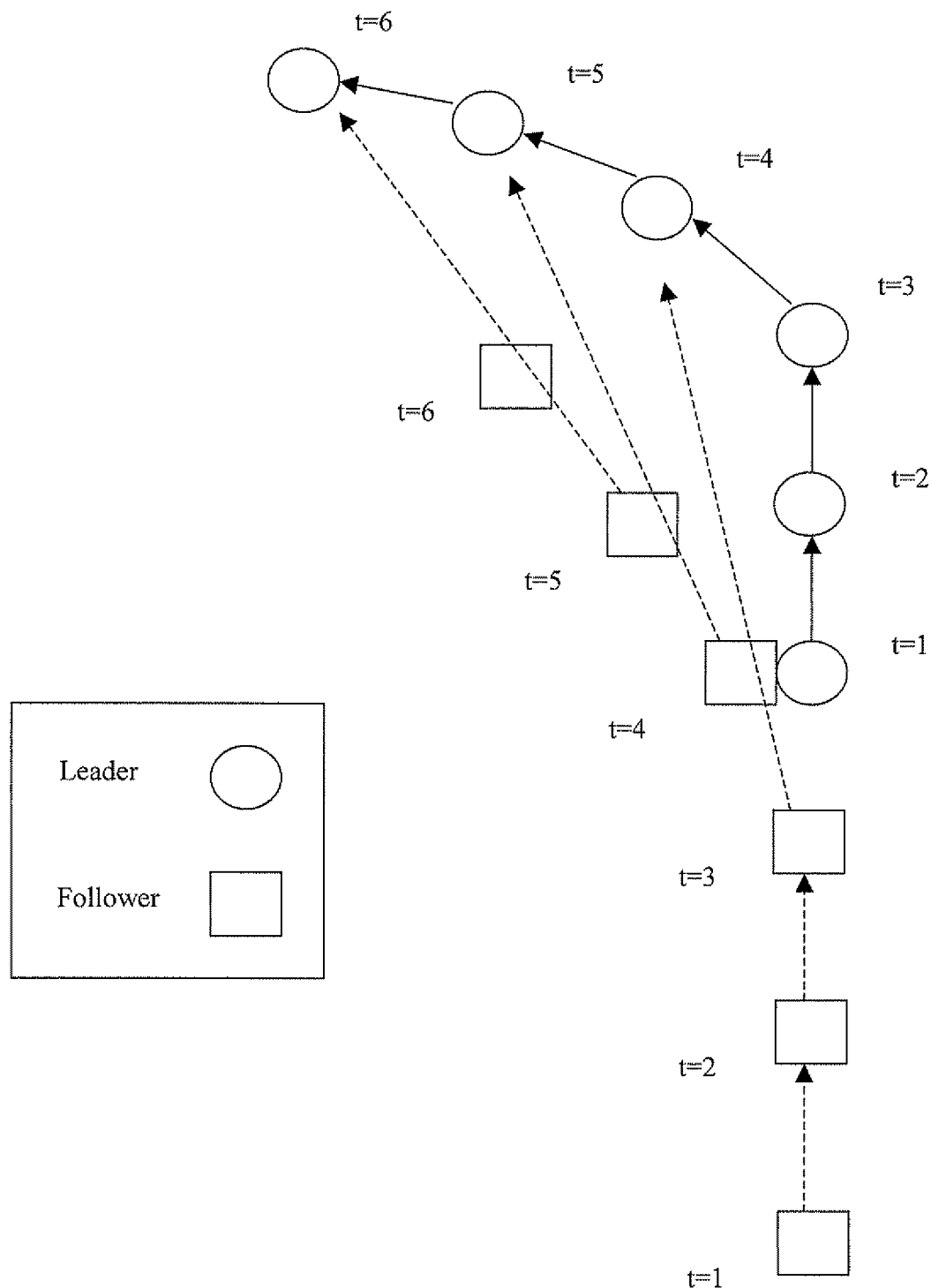
FIG. 5 is a prior art pictorial illustration of paths followed by a soldier and a robot which is following the soldier ("leader"), as opposed to following the path of the soldier.

Reference is now made to prior art FIG. 5 which is a pictorial illustration of paths followed by a soldier and a robot which is following the soldier ("leader"), as opposed to following the path of the soldier. As shown, the soldier is moving along a path indicated by times t(1)-t(6). The path is not straight because the soldier might be skirting around an obstacle. The robot, as shown by its path which is indicated by times t(1)-t(6), is operative to detect and reproduce the exact moves the soldier is performing. Nonetheless, at the end of the process, the soldier might have detoured an obstacle, while the robot, moving in a different course, might have impinged upon that obstacle. Therefore, the methodology of prior art FIG. 5 is not successful.

Figure 6:
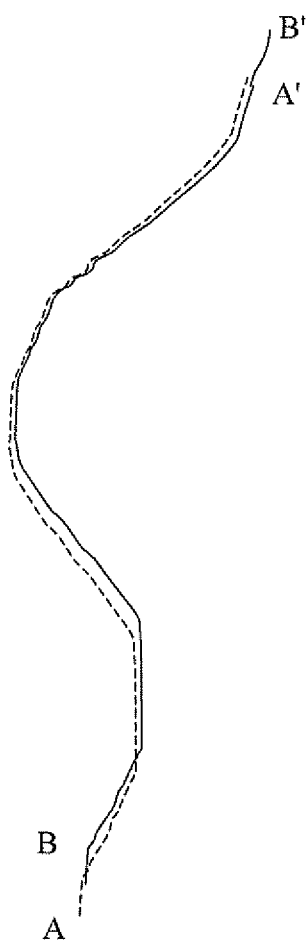
FIG. 6 is a pictorial illustration of a robot, whose path is indicated by a dashed line, using a path following methodology vis a vis a path, indicated in solid line, of a leader, all in accordance with certain embodiments of the present invention.

FIG. 6 is a pictorial illustration of a robot A, whose path is indicated by a dashed line, using a path following methodology vis a vis a path, indicated in solid line, of a leader, all in accordance with certain embodiments of the present invention. The operation of the robot in FIG. 6 is in contrast to the leader path reproducing methodology of FIG. 5. Certain deviations may occur due to accuracy limits of instruments. As shown, when the leader reached point B, located a predetermined distance from A, follower A started to follow the leader's path.

When the leader reached point B', it stopped. Responsively, the follower stopped at point A' at a distance from B' that is defined by its default software or by some control commands from the leader.

According to certain embodiments of the present invention, a robot is provided which is operative to identify a path being followed by a leader and to advance along the path. An example of a method by which a robot such as the robotic platform 10 of FIG. 1, can identify a path being followed by a leader such as the combatant equipped with command unit 80 in FIG. 1, is described herein with reference to FIG. 7. An example of a method by which a robot such as the robotic platform 10 of FIG. 1, can advance along the path identified by the method of FIG. 7 or an alternative path-identifying method, is described herein with reference to FIG. 8.

The method of FIG. 7 typically includes a functionality of building a path for the follower to follow, typically based on the path being followed by the leader. The method of FIG. 7 may include some or all of the following steps, suitably ordered e.g. as shown:

Step 410: Measure follower position Vector F(ti) in a relative coordinate system, relative to last reset point of the coordinate system. Ti is time i in measurement point i.

Step 420: Measure with an instrument the relative position (distance and angle) between the leader and the follower=Vector D(ti).

Step 430: Compute the leader position Vector L(ti) in a relative coordinate system Vector L(ti)=Vector F(ti)+Vector D(ti)

Step 440: Insert Vector L(ti) to a FIFO queue 'q', as element q(n). n is currently the highest index number of the FIFO queue q.

The method of FIG. 8 typically includes a functionality for driving along the path built e.g. by the method of FIG. 7. The method of FIG. 8 may include some or all of the following steps, suitably ordered e.g. as shown:

510: Provide path e.g. by performing the method of FIG. 7 and reading the resulting queue 520: Retrieve first element, q(1) from FIFO queue q. Do not delete element q(1) from FIFO queue q. q(1) is the current waypoint the follower is moving to 530: If the distance Vector D(ti) between follower and leader<pre-programmed distance criteria, then the follower stops moving, waits T seconds and performs step 510. Else, continue to step 540.

540: If the distance between the follower & q(1) position<pre-programmed distance criteria, then continue to step 550. Else, the follower continue moving towards q(1) position. Jump to step 510.

550: Delete element q(1) from the FIFO queue q

560: Repeat some or all of steps 510 to 550 until stopping criterion is reached. Examples for stopping criteria include but are not limited to a command from the leader to stop following the leader, a command from the leader handing over the control of the follower to a different leader e.g. as in FIG. 2 step 130, and shutting down the system.

Figure 9:
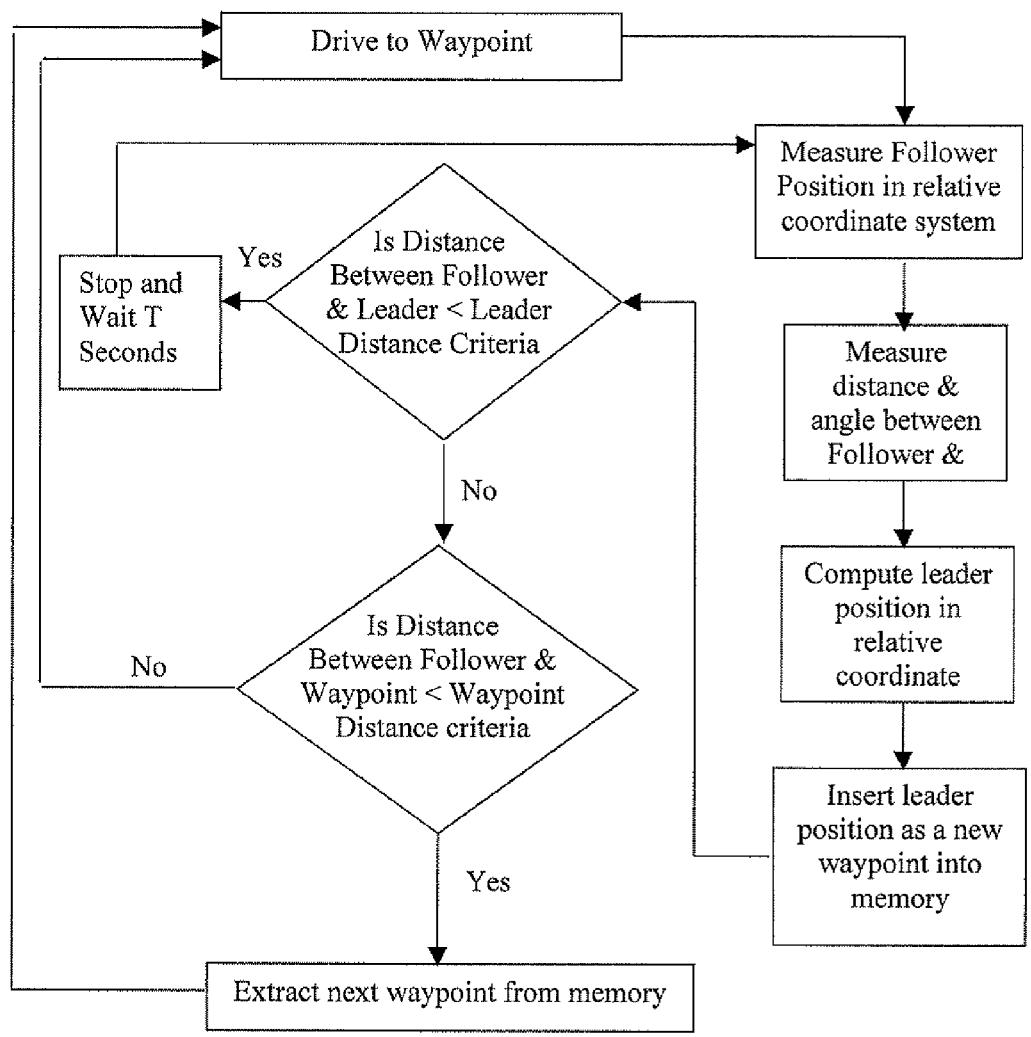
FIG. 9 is a diagram of data flow and data processing generated by and provided in accordance with the method of FIG. 8, including a drive-along-a-path functionality illustrated on the left and a build-a-path-to-follow functionality illustrated on the right.

FIG. 9 is a diagram of data flow and data processing generated by and provided in accordance with the method of FIG. 8. Pre-programmed parameter T might for example be in the order of a few seconds. A suitable Leader Distance criterion might comprise an order of 10 meters, for applications in which a robotic platform is following a soldier as shown and described herein. Waypoint Distance criteria typically depend on the measurement instrument error, and might be in the order of less than 1 meter. Instruments whose errors are higher or lower than 1 meter might also be employed, depending on project resources and mission requirements.

Figure 11:
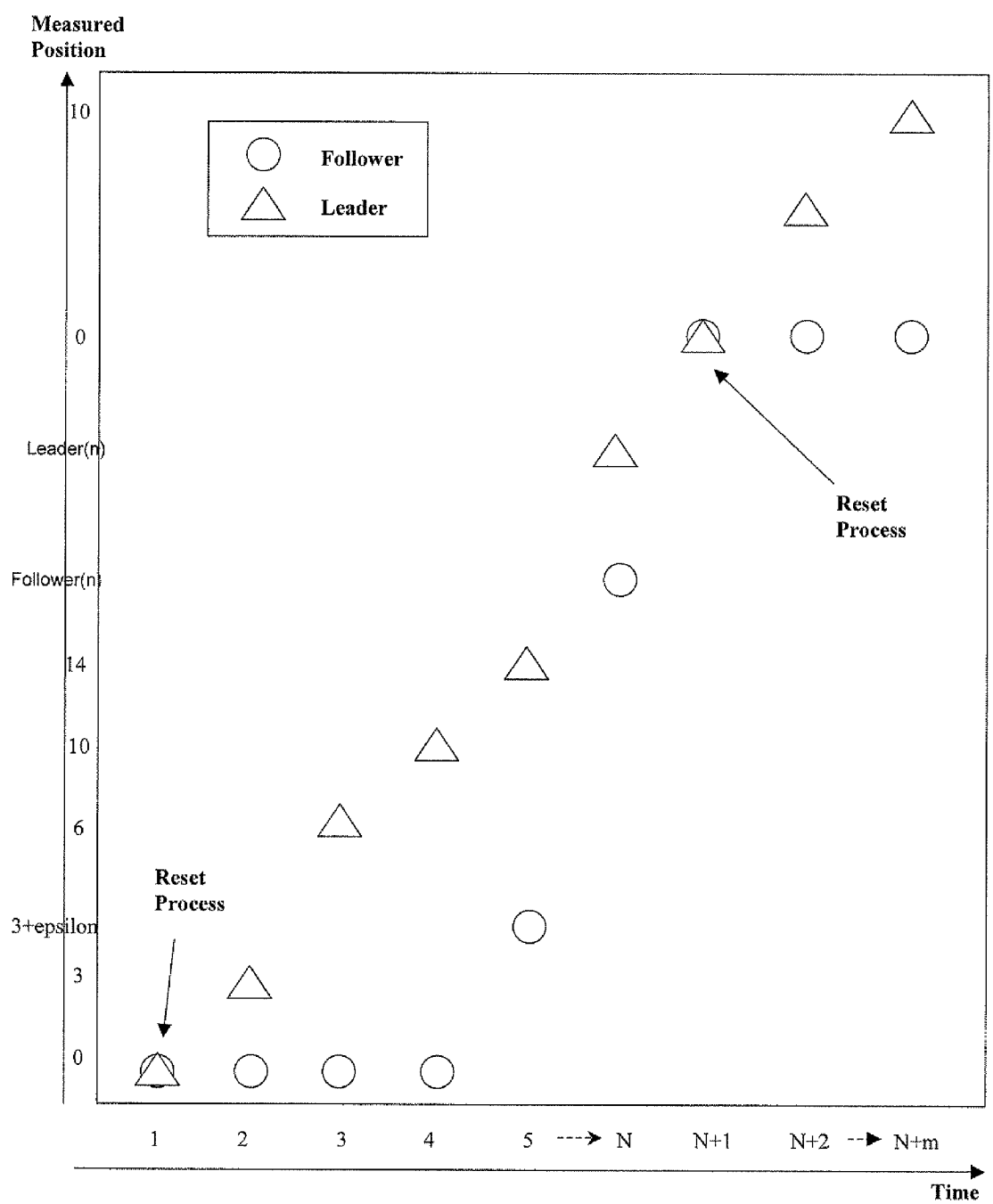

A numerical example of the operation of the embodiment of FIGS. 7-9 is illustrated in FIGS. 10-11, where FIG. 10 is a table of measured and true positions of a leader and follower at various times, and FIG. 11 is a diagram of these positions. Typically, there are three main errors in the position measurements: (a) Leader position error related to the instrument measuring the leader's distance and angle vector D relative to his follower; (b) Instrument errors when measuring vector F, the follower's position relative to the last reset point; and (c) Navigation error of the follower platform.

Typically, the total error, between the follower's momentary position and the leader's path, according to the method described in FIGS. 7 and 8, is statistically bounded. In each algorithm cycle the follower moves towards the leader and a new distance and angle measurement is performed, statistically bounding the follower's position error. Therefore additional measurements of the follower's path, allow computation of vector F(ti) to occur as described in FIG. 7. Since the follower always re-measures its distance from the leader, the errors in position measurement are statistically bounded, and the path the follower is moving along, is continuously corrected or adjusted.

Typically, at start time, the follower moves in a straight line towards the leader position until he approaches that position, complying with a distance-interval criterion such as that described herein, and a distance-from-the-leader's-path criterion such as that described herein.

Four alternative methods for measuring follower position, suitable for performing step 410 in FIG. 7, are now described.

a. Mounting an orientation instrument such as an IMU or INS unit on the follower, thereby to generate various angles along various axes about which degrees of freedom of motion are provided. Outputs are transported or translated to another axis or axes and values such as robots' velocity, distance and angle from a previous measured point are computed.

b. If the follower is a vehicle with wheels, odometers may be mounted on the follower's wheels, thereby to generate an indication of the progress of the vehicle. A suitable commercially available sensor may then be used to measure the change in angle from start point (or "last reset point").

c. Any other instrument that can measure the change in distance and angle from start point (or "last reset point") to current point may be employed.

d. Suitable combinations of methods (a)-(c) may be employed.

Four example embodiments for performing step 420 of FIG. 7 are now described:

a. Scanning lasers embodiment: A scanning laser mounted on the follower scans in two dimensions. The leader carries at least one and typically several corresponding retro-reflectors. The reflections from the one or more retro-reflectors indicates the leader's position characteristics in terms of distance and angle.

b. Radar embodiment: Mounting a radar on the follower platform and analyzing the signals to retrieve the position (distance and angle) of the object which it is desired to track.

c. Optical embodiment: A camera is mounted on the follower and a light emitting object is mounted on the leader. The identity (position in the camera CCD matrix) of the pixel in the camera which received the signal corresponds to hence is representative of the angle between the leader and follower. The distance can be measured by radar, laser or other conventional method for measuring distance between two objects.

d. Other embodiments: Any other instrument that can measure distance and angle between two objects may be employed; alone or in combination with any of the embodiments (a) to (c).

It is appreciated that the tracking methodology shown and described above is merely exemplary and is not intended to be limiting.

The above methodology includes usage of a "Fixed" navigation system and a "Dead Reckoning" system for performing path tracking. One system is associated with the follower object; another system is associated with the leader object. Typically, only a minimal instrument is associated with each of the leader and follower such as a driving instrument typically having manned driving capability. If the leader is human, no driving instrument need be provided due to natural human mobility. Also associated with the follower, typically, are an instrument capable of computing or measuring the follower coordinate relative to the last reset point of a relative coordinate system; and an instrument capable of computing or measuring the relative distance and angle between leader and follower.

Advantages of certain embodiments of this tracking methodology include that it is neither a fixed system like GPS based systems nor a dead reckoning system, but rather a combination of the two. However, the two are typically not combined as in commercial systems merely so that one backs up the other e.g. merely to solve the problem of inoperative UPS by backing up GPS data with data from the INS/IMU. Instead, neither system is a mere "back up" for the other and both are mounted on the follower and operate simultaneously. The fixed system measures leader position relative to follower, whereas the dead reckoning system measures the position of the follower relative to the last well known point, termed herein the reset point.

It is appreciated that the methodology described herein may be used to generate a virtual grid, and enables navigating similar but not identical to GPS navigation, when recording an object's path coordinates is required, all without using GPS.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMS. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or clients for using such; and hardware which performs any or all of the steps of any of the methods shown and described herein, in any suitable order, either alone or in conjunction with software.

Any computations or other forms of analysis described herein may be performed by a suitable computerized method. The invention shown and described herein may include (a) using a computerized method to identify a solution to any of the problems or for any of the objectives described herein. The solution may include at least one of a decision, an action, a product, a service or any other information that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery.

The invention claimed is:

1. A robotic system comprising:
   a robotic platform;
   a follow-path functionality enabling the robotic platform to follow a leading soldier, at least selectably, without reliance on GPS; and
   a Human Machine Interface between the platform and a leading soldier,
   wherein said follow-path functionality defines a current position of the robotic platform by its relationship to the soldier and enables the robotic platform to follow the route of the soldier's footsteps,
   wherein said follow-path functionality includes:
   driving apparatus operative for driving to an individual waypoint along the path and measuring the robot position in a relative coordinate system and measuring the distance and angle between the robot and the leader;
   leader position computation apparatus operative for computing the leader position in a relative coordinate system and storing the leader position as a highest waypoint in a memory device;
   waypoint extraction apparatus operative, when the robot-leader distance is pre-determinedy large and the robot-waypoint distance is pre-determinedly small, to extract a next highest waypoint from the memory device and to return to said driving using said next highest waypoint as said individual waypoint; and
   wherein, when the robot-leader distance is pre-determinedly small, the robot waits a predetermined time period then returns to said driving, otherwise, when the robot-waypoint distance is not pre-determinedly small, the robot returns to said driving.

2. A system according to claim 1 wherein said follow-path functionality also determines a future position of the robotic platform by the robotic platform's relationship to the soldier.

3. A system according to claim 1 wherein said follow-path functionality relies on at least one of IR data, laser data, image processing data, scent data, inertial system data and RF data.

4. A system according to claim 1 wherein said robotic platform provides logistics support at least one of a platoon level and a squad level.

5. A system according to claim 1 wherein said robotic platform includes a diversity of payloads.

6. A system according to claim 5 wherein said diversity of payloads includes at least one replaceable "suit" from among the following set of replaceable "suits": at least one logistics "suit", at least one intelligence "suit", at least one protective "suit", and at least one attack "suit".

7. A system according to claim 1 wherein said robotic platform has no navigation system other than said follow-path functionality.

8. A system according to claim 1 wherein said follow-path functionality enables the robotic platform to follow the soldier's route autonomously and wherein at least most alerts and signals arriving from the soldier are based solely on tactile means.

9. A robotic system comprising:
a robotic platform;
a follow-path functionality enabling the robotic platform to follow a leading soldier; and
a Human Machine Interface between the platform and a leading soldier,
wherein the interface is operative to provide to the robotic platform,
the robotic platform is operative to carry out, a set of dog-training commands, and
said follow-path functionality defines a current position of the robotic platform by its relationship to the soldier and enables the robotic platform to follow the route of the soldier's footsteps,
wherein said follow-path functionality includes:
driving apparatus operative for driving to an individual waypoint along the path and measuring the robot position in a relative coordinate system and measuring the distance and angle between the robot and the leader;
leader position computation apparatus operative for computing the leader position in a relative coordinate system and storing the leader position as a highest waypoint in a memory device,
waypoint extraction apparatus operative, when the robot-leader distance is pre-determinedy large and the robot-waypoint distance is pre-determinedly small, to extract a next highest waypoint from the memory device and to return to said driving using said next highest waypoint as said individual waypoint; and
wherein, when the robot-leader distance is pre-determinedly small, the robot waits a predetermined time period then returns to said driving, otherwise, when the robot-waypoint distance is not pre-determinedly small, the robot returns to said driving.

10. A system according to claim 9 wherein said set of dog-training commands includes at least one of the following: stay, heel, come.

11. A system according to claim 9 wherein the interface includes a first intuitive remote control mode allowing an operator to carry out the set of dog-training commands and not allowing the operator to carry out complex tasks and a second complex remote control mode allowing the operator to carry out at least one complex task including at least one of Manual driving and control of at least one suit borne by the robotic platform.

12. A system according to claim 9 wherein said robotic platform has no navigation system other than said follow-path functionality.

13. A method for operating a robotic system comprising:
providing a follow-path functionality enabling a robotic platform to follow a leading soldier; and
using a Human Machine Interface between the platform and a leading soldier to provide to the robotic platform, and using the robotic platform to carry out, a set of dog-training commands,
wherein said follow-path functionality defines a current position of the robotic platform by its relationship to the soldier and enables the robotic platform to follow the route of the soldier's footsteps,
wherein said follow-path functionality includes:
driving to an individual waypoint along the path and measuring the robot position in a relative coordinate system and measuring the distance and angle between the robot and the leader;
computing the leader position in a relative coordinate system and storing the leader position as a highest waypoint in a memory device;
when the robot-leader distance is pre-determinedly large and the robot-waypoint distance is pre-determinedly small, to extract a next highest waypoint from the memory device and to return to said driving using said next highest waypoint as said individual waypoint; and
wherein, when the robot-leader distance is pre-determinedly small, the robotic platform waits a predetermined time period then returns to said driving, otherwise, when the robot-waypoint distance is not pre-determinedly small, the robotic platform returns to said driving.

14. A robot-leader tracking system comprising:
a robot operative to identify a path being followed by a leader and to advance along said path,
wherein said robot includes:
driving apparatus operative for driving to an individual waypoint along the path and measuring the robot position in a relative coordinate system and measuring the distance and angle between the robot and the leader;
leader position computation apparatus operative for computing the leader position in a relative coordinate system and storing the leader position as a highest waypoint in a memory device;
waypoint extraction apparatus operative, when the robot-leader distance is pre-determinedly large and the robot-waypoint distance is pre-determinedly small, to extract a next highest waypoint from the memory device and to return to said driving using said next highest waypoint as said individual waypoint; and
wherein, when the robot-leader distance is pre-determinedly small, the robot waits a predetermined time period then returns to said driving, otherwise, when the robot-waypoint distance is not pre-determinedly small, the robot returns to said driving.

15. A robot-leader tracking method comprising:
using a robot to identify a path being followed by a leader and to advance along said path,
wherein said using comprises:
driving to an individual waypoint along the path and measuring the robot position in a relative coordinate system and measuring the distance and angle between the robot and the leader;
computing the leader position in a relative coordinate system and storing the leader position as a highest waypoint in a memory device;
when the robot-leader distance is pre-determinedly large and the robot-waypoint distance is pre-determinedly small, extract a next highest waypoint from the memory device and return to said driving using said next highest waypoint as said individual waypoint; and when the robot-leader distance is pre-determinedly small, wait a predetermined time period then return to said driving, otherwise, when the robot-waypoint distance is not pre-determinedly small, return to said driving.

16. A method for operating a robotic system comprising:
providing a follow-path functionality enabling a robotic platform to follow a leading soldier, at least selectably, without reliance on GPS; and
providing a Human Machine Interface between the platform and a leading soldier,
wherein said follow-path functionality defines a current position of the robotic platform by its relationship to the soldier and enables the robotic platform to follow the route of the soldier's footsteps,
wherein said follow-path functionality includes:
driving to an individual waypoint along the path and measuring the robot position in a relative coordinate system and measuring the distance and angle between the robot and the leader;
computing the leader position in a relative coordinate system and storing the leader position as a highest waypoint in a memory device;
when the robot-leader distance is pre-determinedly large and the robot-waypoint distance is pre-determinedly small, to extract a next highest waypoint from the memory device and to return to said driving using said next highest waypoint as said individual waypoint; and
wherein, when the robot-leader distance is pre-determinedly small, the robotic platform waits a predetermined time period then returns to said driving, otherwise, when the robot-waypoint distance is not pre-determinedly small, the robotic platform returns to said driving.

17. A method according to claim 16 wherein:
when non traversable conditions exist, alerting the leading soldier to move from his current position back to the robotic platform's current position and then to select a path other than that which the leading soldier used previously, by which to move from the robotic platform's current position to the leading soldier's former current position.

18. A computer program product, comprising a tangible computer-usable medium having a computer-readable program code embodied therein, said computer-readable program code adapted to be executed to implement a robot-leader tracking method comprising:
using a robot to identify a path being followed by a leader and to advance along said path,
wherein said using comprises:
controlling the robot for driving to an individual waypoint along the path and measuring the robot position in a relative coordinate system and measuring the distance and angle between the robot and the leader;
computing the leader position in a relative coordinate system and storing the leader position as a highest waypoint in a memory device;
when the robot-leader distance is pre-determinedly large and the robot-waypoint distance is pre-determinedly small, extracting a next highest waypoint from the memory device and controlling the robot for return to said driving using said next highest waypoint as said individual waypoint; and
when the robot-leader distance is pre-determinedly small, waiting a predetermined time period then controlling the robot for return to said driving, otherwise, when the robot-waypoint distance is not pre-determinedly small, controlling the robot for return to said driving.

19. A computer program product, comprising a tangible computer-usable medium having a computer-readable program code embodied therein, said computer-readable program code adapted to be executed to implement a method for operating a robotic system comprising:
providing a follow-path functionality enabling a robotic platform to follow a leading soldier; and
controlling the robotic platform to carry out a set of dog-training commands provided by a Human Machine Interface between the platform and a leading soldier,
wherein said follow-path functionality defines a current position of the robotic platform by its relationship to the soldier and enables the robotic platform to follow the route of the soldier's footsteps,
wherein said follow-path functionality includes:
driving to an individual waypoint along the path and measuring the robot position in a relative coordinate system and measuring the distance and angle between the robot and the leader;
computing the leader position in a relative coordinate system and storing the leader position as a highest waypoint in a memory device;
when the robot-leader distance is pre-determinedly large and the robot-waypoint distance is pre-determinedly small, to extract a next highest waypoint from the memory device and to return to said driving using said next highest waypoint as said individual waypoint; and
wherein, when the robot-leader distance is pre-determinedly small, the robotic platform waits a predetermined time period then returns to said driving, otherwise, when the robot-waypoint distance is not pre-determinedly small, the robotic platform returns to said driving.

* * * * *